(12) United States Patent
Philippe et al.

(10) Patent No.: US 12,297,667 B2
(45) Date of Patent: May 13, 2025

(54) ELECTRONIC VEHICLE LATCH WITH SEPARATELY ATTACHED CONTROL UNIT

(71) Applicant: Inteva France, Sully sur Loire (FR)

(72) Inventors: Pascal Philippe, Saulcy/Meurthe (FR); Jean-Marc Belmond, Saint-Jean le Blanc (FR); Jean-Bernard Didier, Anould (FR); Philippe Ottolini, La Voivre (FR); Frederic Burkat, Saulcy sur Meurthe (FR); Daniel Lopez, VS-Obereschach (DE); Christian Holdenried, Villingen-Schwenningen (DE); Oliver Huppenbauer, Villingen-Schwenningen (DE)

(73) Assignees: INTEVA FRANCE, Sully-sur-Loire (FR); MARQUARDT GMBH, Rietheim-Weilheim (DE)

( * ) Notice: Subject to any disclaimer, the term of this patent is extended or adjusted under 35 U.S.C. 154(b) by 200 days.

(21) Appl. No.: 17/489,078

(22) Filed: Sep. 29, 2021

(65) Prior Publication Data

US 2022/0056738 A1   Feb. 24, 2022

Related U.S. Application Data

(63) Continuation of application No. PCT/IB2019/000433, filed on Mar. 29, 2019.

(51) Int. Cl.
*E05B 77/34*     (2014.01)
*B60J 5/04*      (2006.01)
(Continued)

(52) U.S. Cl.
CPC ............. *E05B 77/34* (2013.01); *B60J 5/0418* (2013.01); *E05B 79/02* (2013.01); *E05B 79/04* (2013.01);
(Continued)

(58) Field of Classification Search
CPC ........ B60J 5/0418; B60J 5/416; E05F 15/611; E05B 81/20; E05B 81/54; E05B 83/36;
(Continued)

(56) References Cited

U.S. PATENT DOCUMENTS 7,086,257 B2 * 8/2006 Bucker .................. E05B 85/01
                                                   292/201
8,656,646 B2 * 2/2014 Mieglitz ................ B60R 13/06
                                                   296/146.7

(Continued)

FOREIGN PATENT DOCUMENTS

DE     19622310  A1     12/1997
DE     10131412  A1  *  5/2002  ............. E05B 77/24
(Continued)

OTHER PUBLICATIONS

English translation for DE10131412B4.*
(Continued)

*Primary Examiner* — Justin B Rephann
(74) *Attorney, Agent, or Firm* — CANTOR COLBURN LLP

(57) ABSTRACT

A vehicle latch assembly. The vehicle latch assembly including: an electronic latch; and a separate door control unit fixedly secured to an exterior housing of the electronic latch, wherein electronics for controlling operation of the electronic latch are located in the separate door control unit.

11 Claims, 5 Drawing Sheets

(51) Int. Cl.
  *E05B 79/02* (2014.01)
  *E05B 79/04* (2014.01)
  *E05B 81/20* (2014.01)
  *E05B 81/54* (2014.01)
  *E05B 83/36* (2014.01)

(52) U.S. Cl.
  CPC .............. *E05B 81/20* (2013.01); *E05B 81/54* (2013.01); *E05B 83/36* (2013.01)

(58) Field of Classification Search
  CPC .......... E05B 79/02; E05B 79/04; E05B 77/34; E05B 81/14; E05B 81/06
  See application file for complete search history.

(56) References Cited

U.S. PATENT DOCUMENTS

| | | | | |
|---|---|---|---|---|
| 10,087,671 | B2 * | 10/2018 | Linden | E05B 81/56 |
| 2004/0050121 | A1 * | 3/2004 | Bucker | E05B 77/24 |
| | | | | 70/91 |
| 2005/0235574 | A1 * | 10/2005 | Gomez Camara | E05F 11/488 |
| | | | | 49/502 |
| 2006/0265961 | A1 * | 11/2006 | Winborn | B60J 5/0455 |
| | | | | 49/502 |
| 2009/0313903 | A1 * | 12/2009 | Mieglitz | B60J 5/0418 |
| | | | | 49/493.1 |
| 2018/0038146 | A1 * | 2/2018 | Linden | E05F 15/611 |
| 2019/0024421 | A1 * | 1/2019 | Cumbo | B60Q 1/0011 |

FOREIGN PATENT DOCUMENTS

| | | | | |
|---|---|---|---|---|
| EP | 2314471 | A2 * | 4/2011 | ............ B60J 5/0418 |
| JP | 2001311338 | A | 11/2001 | |
| JP | 6273528 | B2 | 6/2015 | |
| JP | 2015105545 | A | 6/2015 | |

OTHER PUBLICATIONS

International Search Report for International Application No. PCT/IB2019/000433; Application Filing Date: Mar. 29, 2019; dated Jan. 21, 2020, 5 pages.

Written Opinion for International Application No. PCT/IB2019/000433; Application Filing Date: Mar. 29, 2019; dated Jan. 21, 2020, 7 pages.

Chinese Office Action for Chinese Application No. 201990001353.X dated May 5, 2022, 2 Pages.

International Preliminary Report on Patentability for International Application No. PCT/IB2019/000433 dated Sep. 28, 2021, 6 Pages.

Chinese Second Office Action for Chinese Application No. 201990001353.X; dated Sep. 5, 2022.

* cited by examiner

ELECTRONIC VEHICLE LATCH WITH SEPARATELY ATTACHED CONTROL UNIT

CROSS REFERENCE TO RELATED APPLICATIONS

This application is a Continuation Application of PCT/IB/2019/000433, filed on Mar. 29, 2019, the entire contents of which are incorporated herein by reference thereto.

BACKGROUND

Exemplary embodiments of the present disclosure pertain to the art of vehicle door latches and in particular, an electronic door latch with a separately attached control unit.

The door of vehicle is a mobile bodywork elements, usually equipped with a window and a window seal whose peripheral tightness may be imperfect. This is particularly the case in motor vehicle doors with retractable windows in the door.

As such, the vehicle door can be defined as having 2 areas, one considered as the "wet" area, in which the vehicle latch is located, and a second one considered the "dry" area, which is located towards the inside of the vehicle.

In case of electronic vehicle latches or elocks or elatches that are equipped with internal electronic management, the internal electronics of the electronic latch are susceptible to humidity and water as such, the electronic vehicle latches with their internal electronics require a high level of waterproofness in order to guarantee operation of the latch and the availability of the power release at any time, and under any external environment. These extra requirements (e.g., management of water ingress to the latch) add additional costs to the overall system.

In addition, the space available around the electronic vehicle latch when it is installed in the vehicle door is so tight that the size of an external connector required for the integrated electronics of the electronic vehicle latch will limit the number of inputs/outputs to the internal lock management components and thus limit the functions available to the electronic latch.

In addition, regulatory constraints require that the electronic vehicle latch function/operate at all times including; during a loss of power or during an accident where there is damage to the vehicle and in particular the vehicle door. As such, these is requirements add addition burdens to the operational requirements of the electronic vehicle latch.

Accordingly, it is desirable to provide an improved electronic vehicle door latch.

BRIEF DESCRIPTION

Disclosed is a vehicle latch assembly. The vehicle latch assembly including: an electronic latch; and a separate door control unit fixedly secured to an exterior housing of the electronic latch, wherein electronics for controlling operation of the electronic latch are located in the separate door control unit.

In addition to one or more of the features described above, or as an alternative to any of the foregoing embodiments, the vehicle latch assembly further includes: a door presenter operatively coupled to the electronic latch, wherein the electronics also control operation of the door presenter.

In addition to one or more of the features described above, or as an alternative to any of the foregoing embodiments, the electronics include a door latch controller.

In addition to one or more of the features described above, or as an alternative to any of the foregoing embodiments, the electronic latch is located in a wet side of the vehicle door and the separate door control unit is located in a dry side of the vehicle door.

In addition to one or more of the features described above, or as an alternative to any of the foregoing embodiments, the wet side of the vehicle door is located between an external skin of the vehicle door and an inner door panel of the vehicle door.

In addition to one or more of the features described above, or as an alternative to any of the foregoing embodiments, the dry side of the vehicle door is located between an interior trim panel of the vehicle door and the inner door panel of the vehicle door.

In addition to one or more of the features described above, or as an alternative to any of the foregoing embodiments, further including a layer of waterproofing material is located on a surface of the inner door panel that faces the dry side.

In addition to one or more of the features described above, or as an alternative to any of the foregoing embodiments, the separate door control unit is secured to the electronic latch via fasteners that pass through the layer of waterproofing material and the inner door panel.

In addition to one or more of the features described above, or as an alternative to any of the foregoing embodiments, the electronics of the separate door control unit are operably coupled to the electronic latch via electrical connectors that are located in a connector that passes through the layer of waterproofing material and the inner door panel.

In addition to one or more of the features described above, or as an alternative to any of the foregoing embodiments, further including a waterproof sealing material is located in areas where the fasteners and the connector pass through the layer of waterproofing material and the inner door panel.

In addition to one or more of the features described above, or as an alternative to any of the foregoing embodiments, the electronic latch includes a frame member that the fasteners engage in order to secure the separate door control unit to the electronic latch such that a robust mechanical connection is provided between the electronic latch.

In addition to one or more of the features described above, or as an alternative to any of the foregoing embodiments, the frame member is secured to a door reinforcement plate of the vehicle door.

In addition to one or more of the features described above, or as an alternative to any of the foregoing embodiments, wherein no handle is located on an exterior surface of the vehicle door.

Also disclosed is a method for isolating electronics of a vehicle latch assembly from an electronic latch, the method including the steps of: fixedly securing a separate door control unit to an exterior housing of the electronic latch, wherein electronics for controlling operation of the electronic latch are located in the separate door control unit.

In addition to one or more of the features described above, or as an alternative to any of the foregoing embodiments, the electronic latch is located in a wet side of a vehicle door and the separate door control unit is located in a dry side of the vehicle door.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
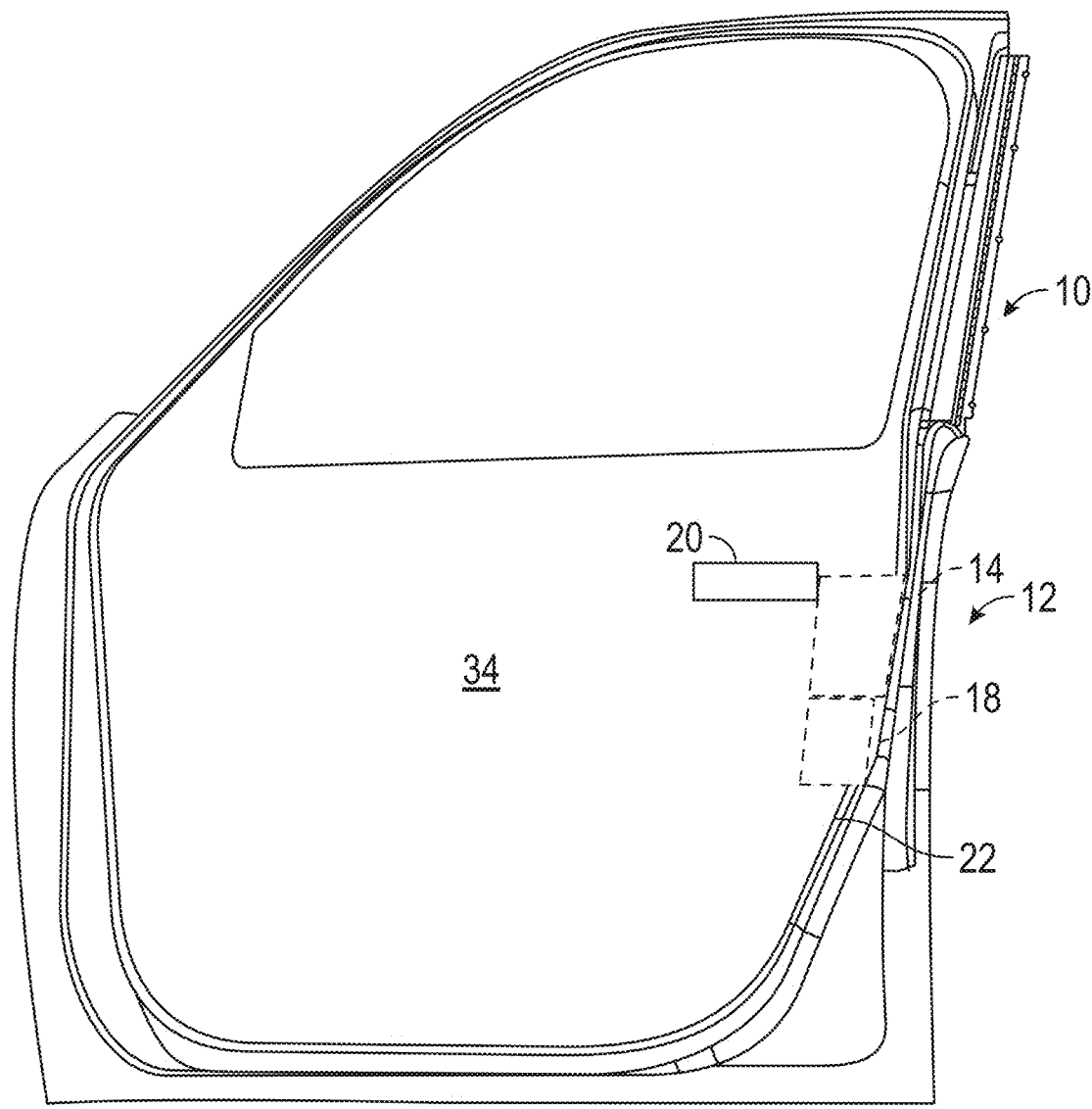
FIG. 1 is a view of a vehicle door with a latch according to the present disclosure.

In FIG. 1, a vehicle door 10 with a vehicle latch assembly 12 in accordance with the present disclosure is illustrated. In FIG. 1, reference numeral 10 generally designates a vehicle door or a vehicle door assembly 10. The vehicle door 10 may be a handleless door (e.g., no handle is located on an exterior surface of the vehicle door 10) and may be installed as a driver side door, passenger side door, or rear passenger doors. Alternatively, the vehicle door may have a handle located on an exterior surface of the vehicle door 10. The vehicle door 10 may be installed as a rear door of the vehicle, such as a liftgate, trunk or tailgate, for example. The vehicle latch assembly 12 is operatively coupled to the vehicle door 10 to hold the door (or liftgate, trunk, tailgate, etc.) in a closed position and to release the vehicle door to allow a user to move the vehicle door 10 to an open position. As mentioned above, the electronic latch 14 is an electromechanical latch assembly which provides opening assistance to a user.

In one embodiment and by not including a door handle on the exterior surface or external skin 28 of the vehicle door 10, the vehicle door 10 may be more aesthetically pleasing and/or provides an additional security measure that inhibits unauthorized access to the vehicle. A keyless entry mechanism or device is employed to initiate a door opening procedure. For example, a fob, mobile device application, keypad, or a similar keyless entry mechanism, may be utilized to actuate door opening. In particular, the electronic latch 14 is actuated to permit door opening.

Working in conjunction with the vehicle latch assembly 12 is a door presenter 18, which is operatively coupled to the electronic latch 14. In one embodiment, the door presenter 18 is secured to an exterior housing of the electronic latch 14.

In the illustrated embodiment, the actuator or door presenter 18 is located inside the vehicle door 10, near the electronic latch 14. In various embodiments, the actuator or door presenter 18 can be above the electronic latch 14 or underneath the electronic latch 14.

Figure 2:
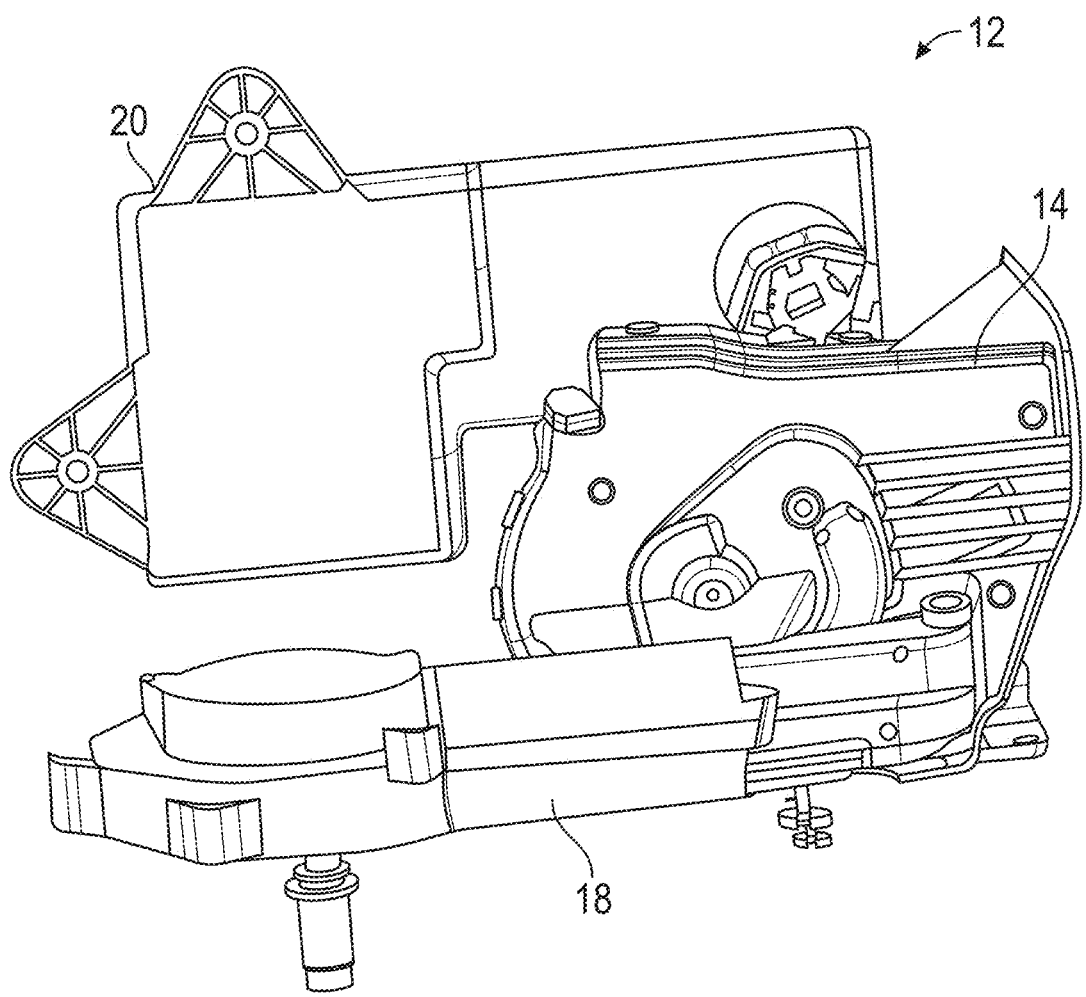
FIG. 2 is perspective view of a latch according to present disclosure.
Figure 3:
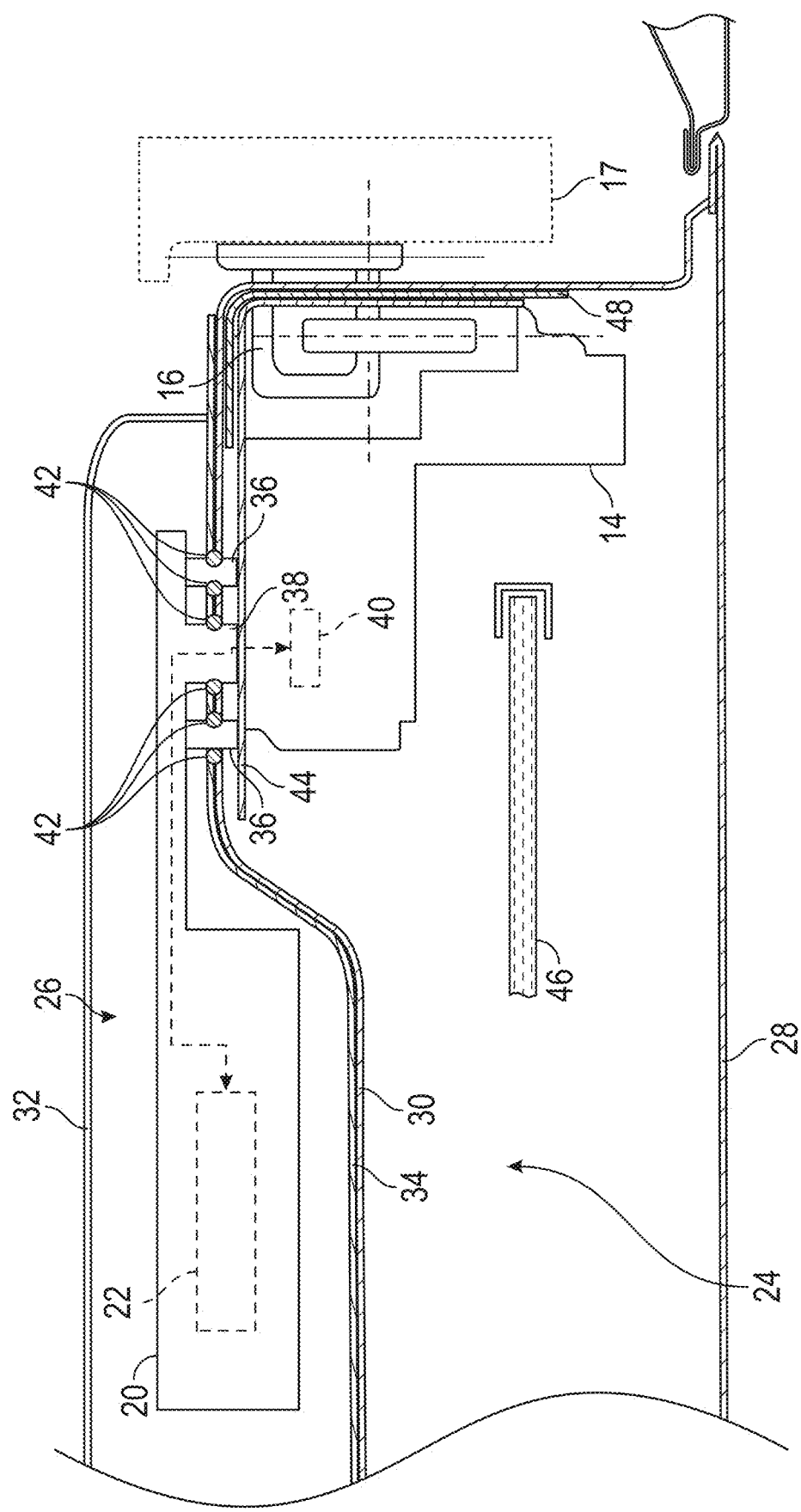
FIG. 3 is a schematic cross-sectional view of a vehicle door with a latch according to the present disclosure.

In the illustrated embodiments of FIGS. 1-3, the vehicle latch assembly 12 comprises three separate components each being secured to each other. The first component of the vehicle latch assembly 12 is an electronic latch 14 configured to engage and release a striker 16 of the vehicle frame 17 such that the vehicle door 10 can be secured and subsequently opened due to operation of the vehicle latch assembly 12. In addition, the vehicle latch assembly 12 also includes an independent actuator or door presenter 18 and a separate door control unit 20. In accordance with the present disclosure the required electronics 22 (illustrated schematically) of the electronic latch 14 are removed from the internal cavity of the electronic latch 14 and they are located in the separate door control unit 20. As such, the electronics 22 for controlling the electronic latch 14 are removed from the internal cavity of the electronic latch 14 and located in the separate door control unit 20. In addition, the door presenter 18 may also be controlled by the electronics 22 of the separate door control unit 20.

In one embodiment, the electronics 22 may be a door latch controller. In the illustrated embodiment, the door latch controller or electronics comprises a microprocessor, microcontroller or other equivalent processing device capable of executing commands of computer readable data or program for executing a control algorithm that controls the operation of the vehicle latch assembly 12. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces.

In the illustrated embodiment, the separate door control unit 20 and its associated electronics are external to the electronic latch 14. However, the separate door control unit 20 is in close proximity to the electronic latch 14. As used herein close proximity to the electronic latch 14 means that the separate door control unit 20 is directly secured to an exterior housing of the electronic latch 14.

In one alternative embodiment, the vehicle latch assembly 12 only comprises the electronic latch 14 and the separate door control unit 20. In other words, there is no separate independent actuator or door presenter 18. As such and as used herein vehicle latch assembly 12 may refer to a vehicle latch assembly 12 comprising only the electronic latch 14 and the separate door control unit 20 or a vehicle latch assembly 12 comprising the electronic latch 14, the independent actuator or door presenter 18 and the separate door control unit 20.

As illustrated in at least FIG. 3, the electronic latch 14 is located in the "wet side' 24 of the vehicle door 10 while the separate door control unit 20 is located in the "dry side" 26 of the vehicle door 10. Thus, the housing of the separate door control unit 20 no longer requires the same level of water, dust or resistant to moisture in comparison to an electronic vehicle latch with internal electronics that is installed in the "wet side" of the vehicle door.

As used herein "wet side" 24 refers to the area of the vehicle door 10 that is located between an external skin 28 of the vehicle door 10 and an inner door panel or metal sheet or sealing wall 30 while "dry side" 26 refers to the area of the vehicle door 10 that is located between an internal or interior trim panel 32 of the vehicle door 10 and the inner door panel or metal sheet 30 of the vehicle door 10. In other words, the external skin 28 of the vehicle door 10 is viewed from the outside of the vehicle and the internal or interior trim panel 32 is the show surface of the interior of the vehicle that the occupant sees/feel when they are in the vehicle. In order to provide the "dry side" 26, a layer or sheet of waterproofing material 34 is located on the surface of the inner door panel or metal sheet 30 that faces the "dry side' 26.

Also shown in FIG. 3 is that the separate door control unit 20 is secured to the electronic latch 14 via fasteners or fixation elements 36 that pass through the layer of waterproofing material 34 and the inner door panel or metal sheet 30. In addition, the electronics 22 of the separate door control unit 20 are operably coupled to the electronic latch 14 via electrical connectors or other equivalent components that are located in a connector 38 that passes through the layer of waterproofing material 34 and the inner door panel or metal sheet 30. In one embodiment, these electrical connectors may be male and female one of which is secured to the electronic latch 14 and the other one of which is secured to the separate door control unit 20. As such, the electronics 22 of the separate door control unit 20 are operably coupled (as illustrated by the dashed lines) to a component or components 40 of the electronic latch 14 in order to control operation of the component or components 40 of the electronic latch 14. In one embodiment, the component 40 may be a motor or actuator of the electronic latch 14. In addition, the electronics 22 of the separate door control unit 20 are also operably coupled to control a component or components 40 of the door presenter in order to control operation of the component or components of the door presenter 18. In one embodiment, the component may be a motor or actuator of the door presenter 18.

In order to ensure that there is no ingress of water or moisture into the dry side 26 waterproof sealing material 42 is located in the areas where the fasteners or fixation elements 36 and the connector 38 passes through the layer of waterproofing material 34 and the inner door panel or metal sheet 30.

In one embodiment, the electronic latch 14 further comprises a frame member 44 that the fasteners or fixation elements 36 engage in order to secure the separate door control unit 20 to the electronic latch 14. This provides a robust mechanical connection between the electronic latch 14 and the door control unit 20, which results in a rigid fixing of the door control unit 20 to the frame 44 or housing of the electronic latch 14. The robust securement will ensure that the door control unit 20 does not become mechanically disconnected from the electronic latch 14 so that no electrical connection is lost during a crash, including when the vehicle 10 door and sealing wall 30 are deformed.

Also shown in FIG. 3 is a portion of a door window 46 located in the vehicle door 10 as well as a door reinforcement plate 48. In one embodiment, the frame 44 may be secured to the door reinforcement plate 48 further providing a robust mechanical securement of the separate door control unit 20 to the electronic latch 14, which again will ensure that the door control unit 20 does not become mechanically disconnected from the electronic latch 14 so that no electrical connection is lost during a crash, including when the vehicle 10 door and sealing wall 30 are deformed.

Figure 4:
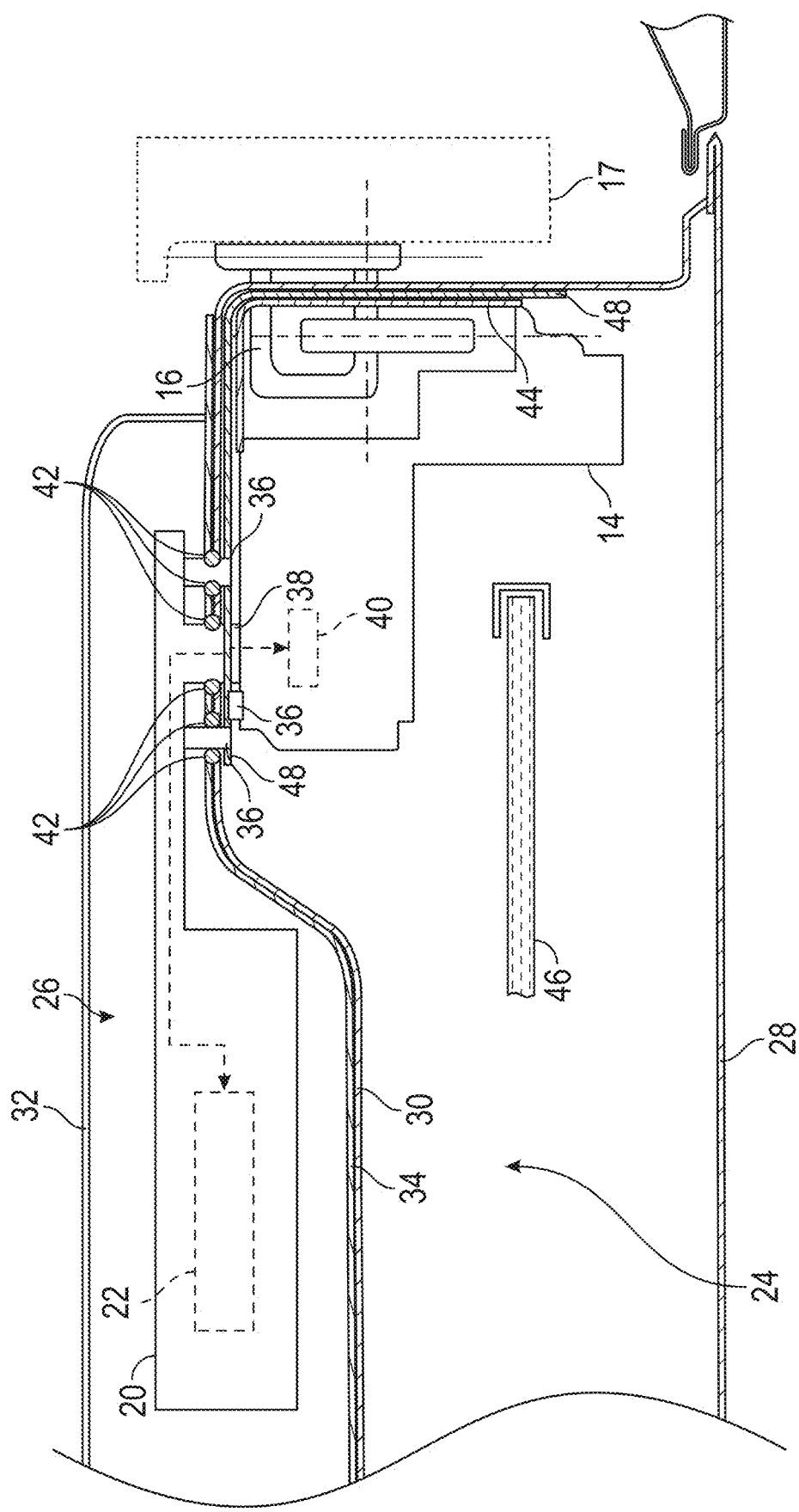
FIG. 4 is a schematic cross-sectional view of a vehicle door with a latch according to an alternative embodiment of the present disclosure.

Referring now to FIG. 4, another embodiment of the present disclosure is illustrated. Here the reinforcement plate 48 extends about at least two sides of the housing of the electronic latch 14 and the rigid fixing of the door control unit 20 and the housing of the electronic latch 14 is achieved by securement of these components to the door reinforcement plate 48 by the fasteners or fixation elements 36. Again, this will ensure that the door control unit 20 does not become mechanically disconnected from the electronic latch 14 so that no electrical connection is lost during a crash, including when the vehicle 10 door and sealing wall 30 are deformed.

Figure 5:
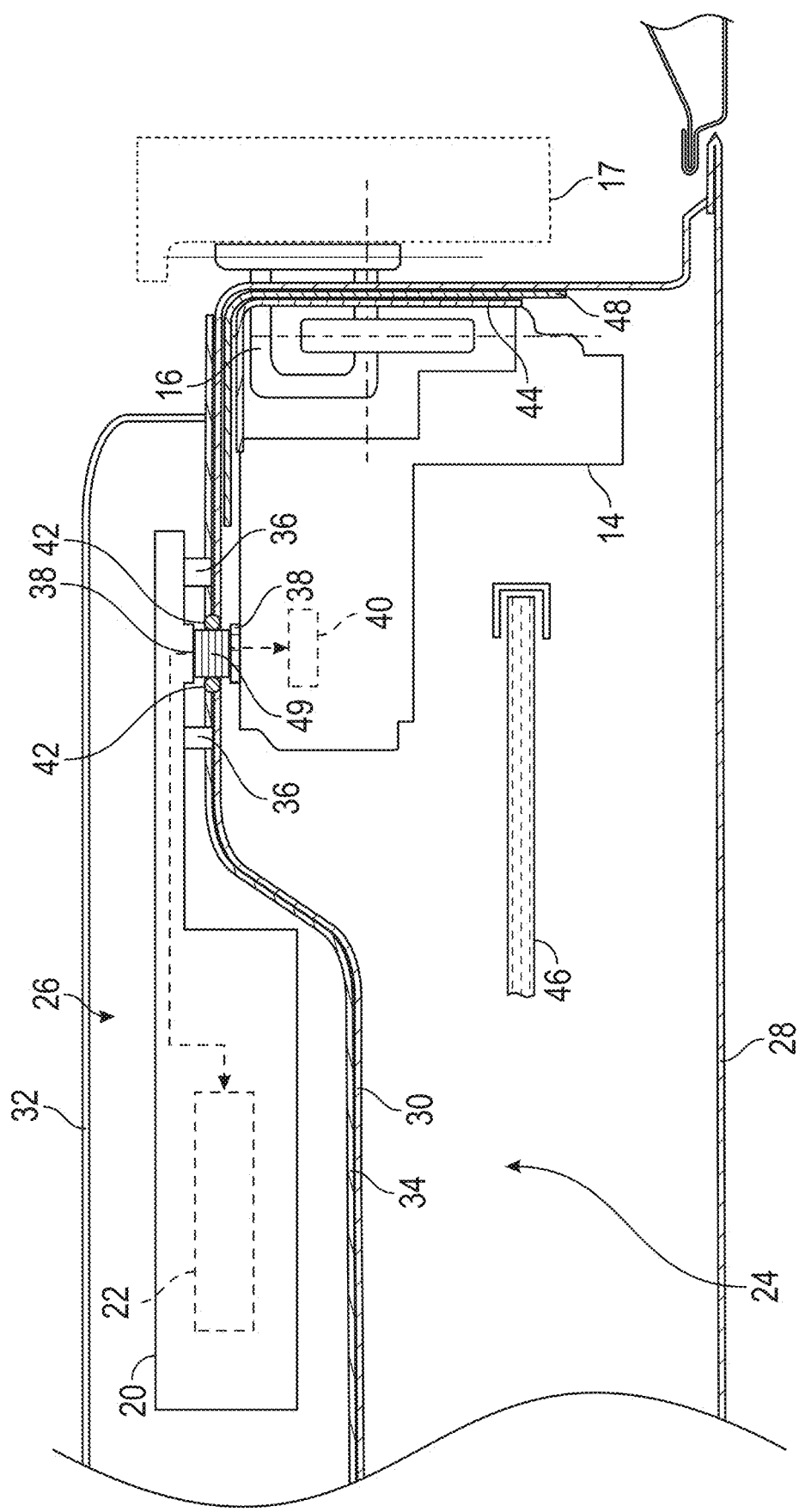
FIG. 5 is a schematic cross-sectional view of a vehicle door with a latch according to yet another alternative embodiment of the present disclosure.

Referring now to FIG. 5, yet another embodiment of the present disclosure is illustrated. Here the door control unit 20 is rigidly fixed to the inner door panel or metal sheet 30 via the fasteners or fixation elements 36. In this embodiment, the electrical connection between the door control unit 20 and the electronic latch 14 is provided by a flexible connection 49 such as wire hardness or flexible printed circuit boards (PCB) or other equivalent means that extends between a connector 38 of the door control unit 20 and a connector of the electronic latch 14 so that the door control unit 20 does not disconnect from the electronic lock 14, preventing any loss of electrical connection between the door control unit 20 and the electronic latch 14 in the event of an accident, even if the vehicle door 10 and sealing wall 30 are deformed.

Various embodiments of the present disclosure are directed to separating electronic components of the vehicle latch assembly 12 from the electronic latch 14 by keeping the electronic latch 14 in the wet area 24 of the vehcile door 10 and keeping the electronic components 22 of the vehicle latch assembly 12 in the dry area 26 of the vehicle door 10 while keeping a robust mechanical connection between the electronic latch 14 and the electronic components 22 through the layer or sheet of waterproofing material 34.

This robust design also results in the addition of sealing elements between door control unit 20, the door panel 30 and the sheet of waterproofing material 34 to ensure system functionality throughout the vehicle's lifetime.

By locating the door control unit 20 in the dry side 26 of the vehcile door 10 the electronics 22 of the electronic latch 14 no longer have to be in the wet side 24. This allows for ease of management of the electronic function the electronic latch 14 as well as and its fixation within the cavity of the vehcile door 10.

By moving the electronics 22 of the electronic latch 14 into the dry side, other benefits are provided. For example, the door control unit 20 may be configured to house electronics for management and control other vehcile door functions, such as movement of a window regulator motor, operation of cameras, operation of mirrors (adjustment, memories, defrosting, electrochromy, indicator indicator recall, temperature sensor, electric folding, auxiliary lighting, blind spot warning, etc.), operation of interior lighting or door edge lighting, operation of vehical door switch panels, etc.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The present disclosure describes and illustrates a design arrangement without illustrating a partial door module or a door module. However it is, of course, contemplated that the vehicle latch assembly 12 may be incorporated into a partial door module and/or a door module thereby ensuring ease of the electronic latch assembly 12 installation as well a more robust waterproofness between the dry side 26 and the wet side 24 and thus an overall improved waterproofness of the door control unit 10.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle latch assembly for a vehicle door, comprising:
    an electronic latch; and
    a separate door control unit fixedly secured to an exterior housing of the electronic latch, wherein electronics for controlling operation of the electronic latch are located in the separate door control unit,
    wherein the electronic latch is located in a wet side of the vehicle door and the separate door control unit is located in a dry side of the vehicle door,
    wherein the dry side of the vehicle door is located between an interior trim panel of the vehicle door and an inner door panel of the vehicle door,
    wherein a layer of waterproofing material is located on a surface of the inner door panel that faces the dry side, and
    wherein the separate door control unit is secured to the electronic latch via fasteners that pass through the layer of waterproofing material and the inner door panel.

2. The vehicle latch assembly as in claim 1, further comprising: a door presenter operatively coupled to the electronic latch, wherein the electronics also control operation of the door presenter.

3. The vehicle latch assembly as in claim 2, wherein the electronics include a door latch controller.

4. The vehicle latch assembly as in claim 1, wherein the electronics include a door latch controller.

5. The vehicle latch assembly as in claim 1, wherein the wet side of the vehicle door is located between an external skin of the vehicle door and the inner door panel of the vehicle door.

6. The vehicle latch assembly as in claim 1, wherein the electronics of the separate door control unit are operably coupled to the electronic latch via electrical connectors that are located in a connector that passes through the layer of waterproofing material and the inner door panel.

7. The vehicle latch assembly as in claim 6 wherein a waterproof sealing material is located in areas where the fasteners and the connector pass through the layer of waterproofing material and the inner door panel.

8. The vehicle latch assembly as in claim 1, wherein the electronic latch further comprises a frame member that the fasteners engage in order to secure the separate door control unit to the electronic latch such that a robust mechanical connection is provided between the electronic latch.

9. The vehicle latch assembly as in claim 8, wherein the frame member is secured to a door reinforcement plate of the vehicle door.

10. The vehicle latch assembly as in claim 1, wherein no handle is located on an exterior surface of the vehicle door.

11. A method for isolating electronics of a vehicle latch assembly from an electronic latch in a vehicle door, comprising:
    fixedly securing a separate door control unit to an exterior housing of the electronic latch, wherein electronics for controlling operation of the electronic latch are located in the separate door control unit,
    wherein the electronic latch is located in a wet side of the vehicle door and the separate door control unit is located in a dry side of the vehicle door,
    wherein the dry side of the vehicle door is located between an interior trim panel of the vehicle door and an inner door panel of the vehicle door,
    wherein a layer of waterproofing material is located on a surface of the inner door panel that faces the dry side, and
    wherein the separate door control unit is secured to the electronic latch via fasteners that pass through the layer of waterproofing material and the inner door panel.

* * * * *